(12) United States Patent
Nishijima et al.

(10) Patent No.: US 7,381,897 B2
(45) Date of Patent: Jun. 3, 2008

(54) POWER SUPPLY APPARATUS FOR SLIDING STRUCTURE

(75) Inventors: Masataka Nishijima, Shizuoka (JP); Naomi Kisu, Shizuoka (JP); Tatsuro Matsuo, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/591,544

(22) Filed: Nov. 2, 2006

(65) Prior Publication Data

US 2007/0107926 A1    May 17, 2007

(30) Foreign Application Priority Data

Nov. 17, 2005    (JP)    ............... 2005-333408

(51) Int. Cl.
*H01B 7/06*    (2006.01)
(52) U.S. Cl. .................. 174/72 A; 174/68.1; 174/68.3; 174/135; 439/162
(58) Field of Classification Search ............ 174/72 A, 174/68.1, 68.3, 69, 97–99 R, 135, 72 C, 174/70 R, 70 C; 439/34, 162; 361/826
See application file for complete search history.

(56) References Cited

U.S. PATENT DOCUMENTS 6,809,264 B2 * 10/2004 Watanabe et al. ......... 174/72 A
2002/0005014 A1    1/2002 Doshita et al.

FOREIGN PATENT DOCUMENTS

JP    2005-308099    11/2005

* cited by examiner

*Primary Examiner*—Dhiru R Patel
(74) *Attorney, Agent, or Firm*—Kratz, Quintos & Hanson, LLP (57) ABSTRACT

Providing a power supply apparatus for a sliding structure, which can prevent a wiring harness from penetrating into an opening when the sliding structure is opened half, and sound noise when the sliding structure is closed, the power supply apparatus for the sliding structure includes a car body, a sliding door mounted slidably on the car body, the wiring harness wired between the car body and the sliding door, a fixed portion and a limiting member. One end of the wiring harness is fixed at the car body. The other end of the wiring harness is fixed at the fixed portion, which is mounted on the sliding door. The limiting member abuts on a bottom edge of an inner edge of an opening.

4 Claims, 8 Drawing Sheets

POWER SUPPLY APPARATUS FOR SLIDING STRUCTURE

The priority application Number Japan Patent Application 2005-333408 upon which this patent application is based is hereby incorporated by reference.

BACKGROUND OF THE INVENTION

1. Field of the Invention

This invention relates to a power supply apparatus for a sliding structure, which is mounted on the sliding structure such as, a sliding door of a vehicle for supplying continuously electric power to for example an auxiliary device at the sliding structure.

2. Description of the Related Art

Figure 10:
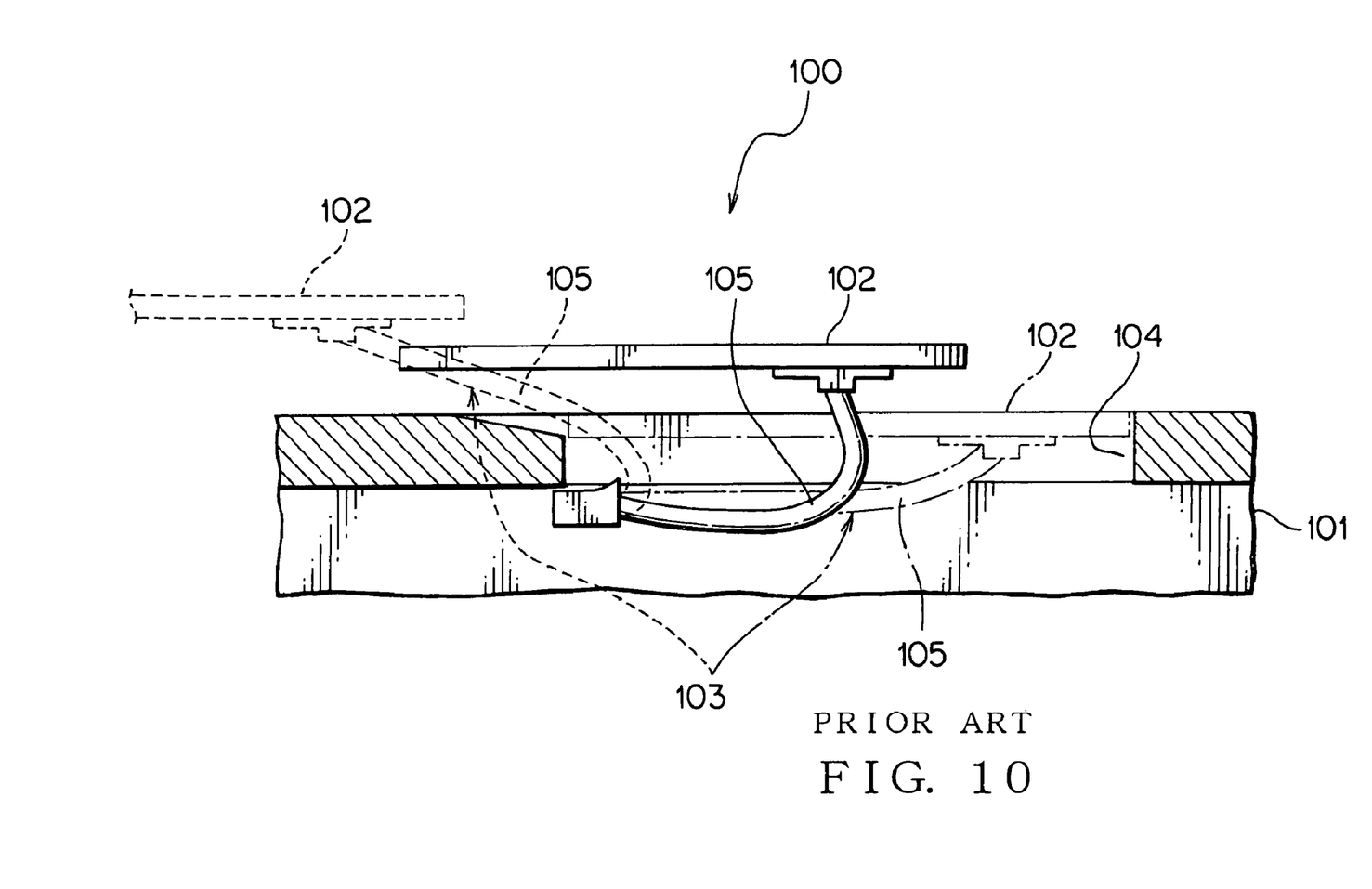
FIG. 10 is an illustrating view of a power supply apparatus for a sliding structure by Prior Art.

A power supply apparatus 100 for a sliding structure (call power supply apparatus hereafter) shown in FIG. 10 for supplying continuously electric power to for an auxiliary device at a sliding door as the sliding structure of a vehicle is provided. The power supply apparatus 100 includes a car body 101 as a base, a sliding door 102 provided slidably on the car body 101 and a wiring harness 103 wired between the car body 101 and the sliding door 102.

The car body 101 is provided with an opening 104, through which a passenger goes into and out from a passenger room arranged at the car body. The sliding door 102 can move slidingly between a close position, in which the sliding door 102 closes the opening 104, shown with a long dashed short dashed long line in FIG. 10, and an open position, in which the sliding door 102 completely opens the opening 104, shown with a dashed line in FIG. 10.

The wiring harness 103 includes a plurality of electric wires (not shown) and a corrugate tube 105 receiving the electric wires. The electric wires connects electrically auxiliary devices mounted on the car body and the auxiliary devices mounted on the sliding door 102. The corrugate tube 105 is elastically deformable. One end portion of the corrugate tube 105 is fixed on the car body 101. The other end portion of the corrugate tube 105 is mounted pivotably on the sliding door 102.

According to the power supply apparatus 100, by elastically deforming the corrugate tube 105 of the wiring harness 103 and swinging the other end portion of the corrugate tube 105 against the sliding door 102, the sliding door 102 can move between the close position and the open position. By wiring the electric wires through the corrugate tube 105, the auxiliary device mounted on the car body 101 and the auxiliary device mounted on the sliding door 102 are connected electrically so as to continuously supply electric power to the auxiliary devices mounted on the sliding door 102.

Patent reference 1 is the Japan Published Patent Application No. 2005-308099.

SUMMARY OF THE INVENTION

Objects to be Solved

According to the power supply apparatus, when the sliding door 102 positions at a middle position between the close position and the open position as shown in FIG. 10, the corrugate tube 105, that is the wiring harness 103 is slacked so as to penetrate through the opening 104 into the passenger room. Thereby, the corrugate tube may be caught by an object in the passenger room and the power supply apparatus may be broken unexpectedly.

According to the power supply apparatus 100, when the sliding door 102 is positioned in the close position, the corrugate tube 105 is extended linearly. Thereby, the corrugate tube 105 could be vibrated by vibration of a running car and abut on the car body. Undesirably, it makes sound noise that the corrugate tube 105 strikes the car body 101.

One object of the present invention is to provide a power supply apparatus for a sliding structure, which can prevent a wiring harness from penetrating into a car body when the sliding structure is opened half, and can prevent generating sound noise when the sliding structure closes an opening.

How to Attain the Object of the Present Invention

In order to attain the object of the present invention, a power supply apparatus for a sliding structure of the present invention is characterised by including a base having an opening; the sliding structure provided slidably against the base so as to move between a close position, in which the sliding structure closes the opening, and an open position, in which the sliding structure open the opening; a wiring harness wired between the base and the sliding structure; and a limiting device provided at the wiring harness so as to limit the wiring harness to move toward the base by abutting on an inner edge portion of the opening when the sliding structure positions between the close position and the open position.

The power supply apparatus for the sliding structure is characterised in the power supply apparatus mentioned above in that the limiting device is arranged at a center portion in a lengthwise direction of the wiring harness.

The power supply apparatus for the sliding structure is further characterised in the power supply apparatus for the sliding structure mentioned above in that the wiring harness includes an electric wire, and the limiting device includes a mount portion to be mounted on the tube body and a projecting portion projecting from the mount portion and allowable to abut on the inner edge portion of the opening.

The power supply apparatus for the sliding structure is further characterised in the power supply apparatus for the sliding structure mentioned above in that the tube body is formed into a bellows shape with alternated convex portions and concave portions along the lengthwise direction of the wiring harness, and the limiting device includes a plurality of separated member sets, at least one separated member set having a positioning projection to penetrate into the concave portion.

EFFECT OF THE INVENTION

According to the invention, since the limiting device abuts on the inner edge portion of the opening, and limits the wiring harness to penetrate into the car body, it is prevented that the wiring harness is caught by an object in the car body and broken unexpectedly.

Since the limiting device abuts on the inner edge portion of the opening, the wiring harness is prevented from vibration. Thereby, generating sound noise is prevented.

According to the invention, since the center portion of the wiring harness, which is most easily slacked, is limited to penetrate into the car body, it is securely prevented that the wiring harness is broken unexpectedly.

According to the invention, since the wiring harness is securely prevented from penetrating into the car body by the limiting device, it is securely prevented that the wiring harness is broken unexpectedly.

According to the invention, since the limiting device is prevented from displacing along the lengthwise direction of the wiring harness and from displacing from a position in which the limiting device can abut on the inner edge portion of the opening, the limiting device can securely prevent the wiring harness from penetrating into the car body.

The above and other objects and features of this invention will become more apparent from the following description taken in conjunction with the accompanying drawings.

DESCRIPTION OF THE PREFERRED EMBODIMENT

A power supply apparatus for a sliding structure (call power supply apparatus hereafter) of one embodiment according to the present invention will be described with reference to FIGS. 1-9.

A power supply apparatus 1 includes a car body 3 as a base of a car 2, a sliding door 4 as a sliding structure mounted slidably on the car body 3, a wiring harness 5 wired between the car body 3 and the sliding door 4, a fixed portion 6 and a limiting device 7. The car body 3 has an opening 9, through which a passenger goes into and out from a passenger room arranged at a car main body 8 of the car 2. The opening 9 passes through a side wall of the car body 3.

The sliding door 4 is formed into a flat plate shape. The sliding door 4 has a door panel 10 made of sheet metal shown in FIGS. 2, 3. The sliding door 4 is supported slidably by a rail (not shown) mounted on the car body 3. The sliding door 4 is mounted slidably between a close position, in which the sliding door 4 closes the opening 9, shown with a long dashed short dashed long line in FIG. 1, and an open position, in which the sliding door 4 completely opens the opening 9, shown with a dashed line in FIG. 1. The sliding door 4 moves gradually toward an outside in a direction of widthwise of the car 2 when the sliding door 4 moves from the close position to the open position.

The wiring harness 5 includes a wire bundle 11 formed by bundling a plurality of electric wires, a body-side connector 12 and a corrugate tube 13 as a tube body. The electric wires forming the wire bundle 11 are covered wires having a conductive core wire and a cover covering the core wire. The wire bundle is formed by surrounding the plurality of electric wires with a tape. One end of the wire bundle 11 is joined with the body-side connector 12, and the other end thereof is connected to auxiliary devices (not shown), such as switches and lights mounted in the door panel 10. Thus, the wire bundle 11, that is the wiring harness 5 is wired between the car body 3 and the sliding door 4.

The body-side connector 12 is connected to ends of the plurality of electric wires of the wire bundle 11, and provided in the vicinity of a step portion of the car body 3 of the car 2, in an edge area of the opening 9 near to rear side of the car 2. The body-side connector 12 is connected to auxiliary devices mounted on the car body 3, such as a battery or a generator of the car 2.

The corrugate tube 13 is formed into a tube shape with an oval cross-section. A major axis of the oval cross-section is arranged along a vertical direction of the car. The corrugate tube 13 is made of synthetic resin to be bendable. When the corrugate tube 13 is bent, a certain value of restoring force is generated.

Figure 1:
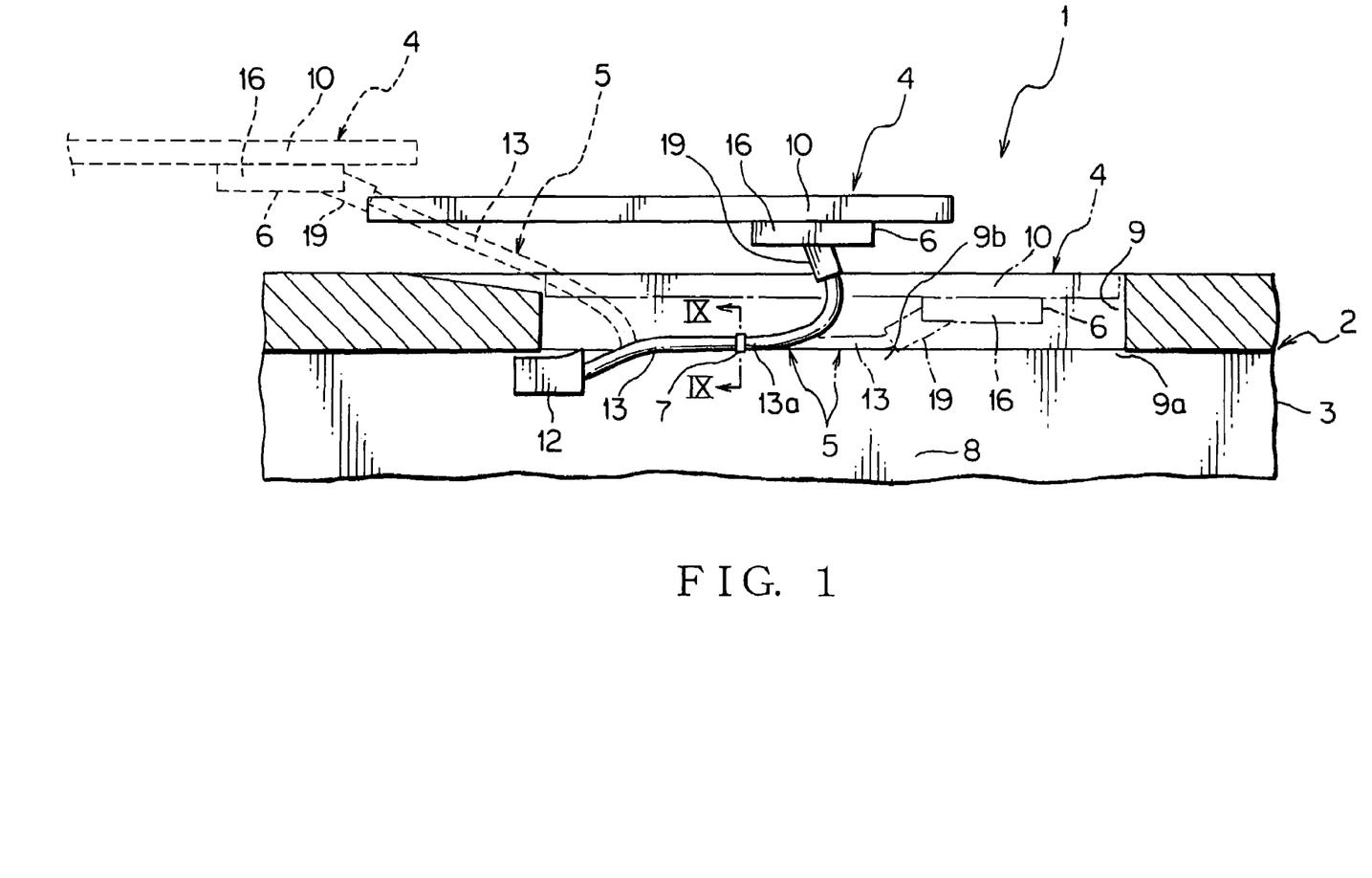
FIG. 1 is an illustrating view of a power supply apparatus for a sliding structure of one embodiment according to the present invention.
Figure 2:
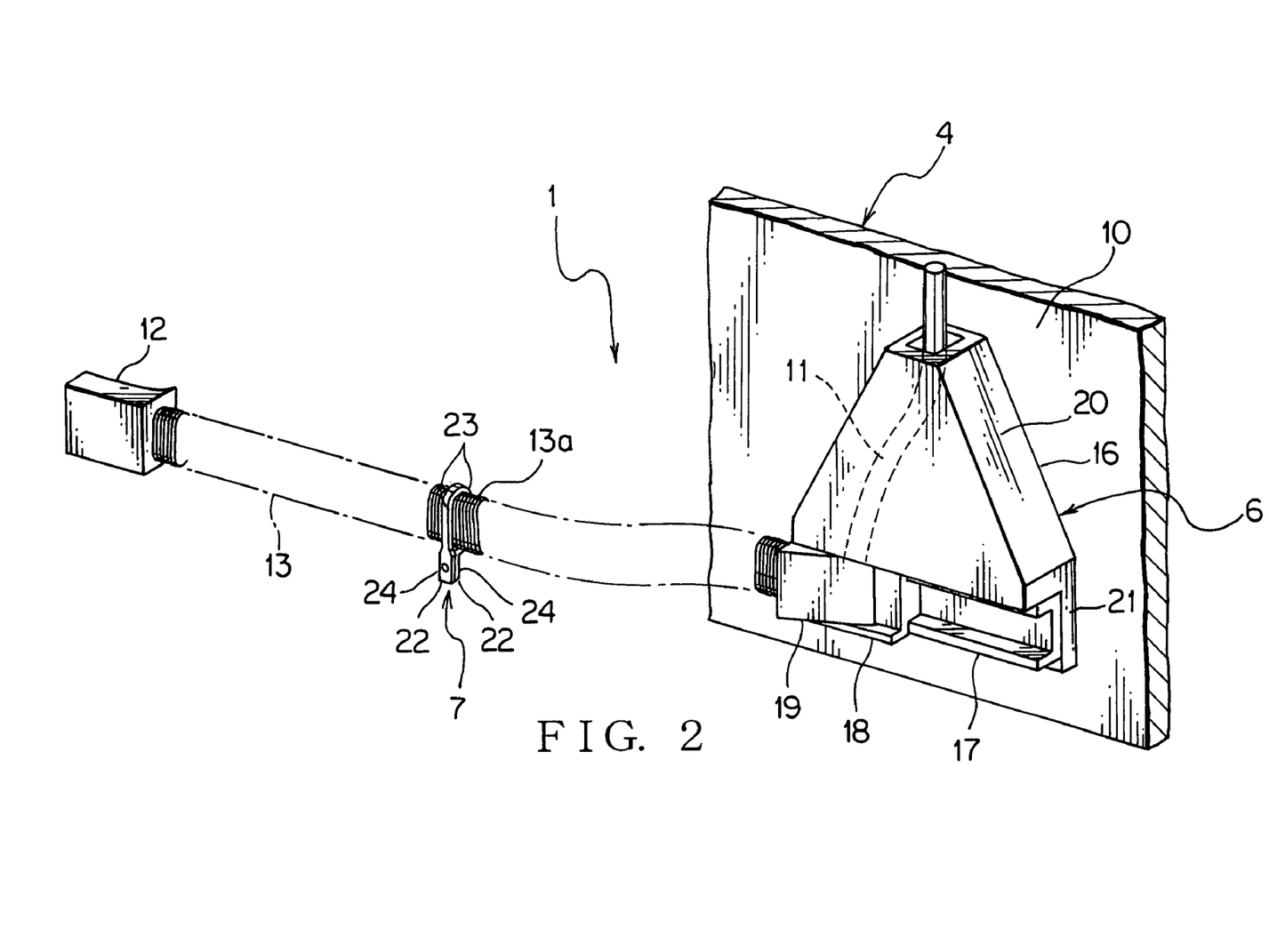
FIG. 2 is a perspective view of a power supply apparatus and a sliding door, in which the power supply apparatus is mounted, shown in FIG. 1.
Figure 3:
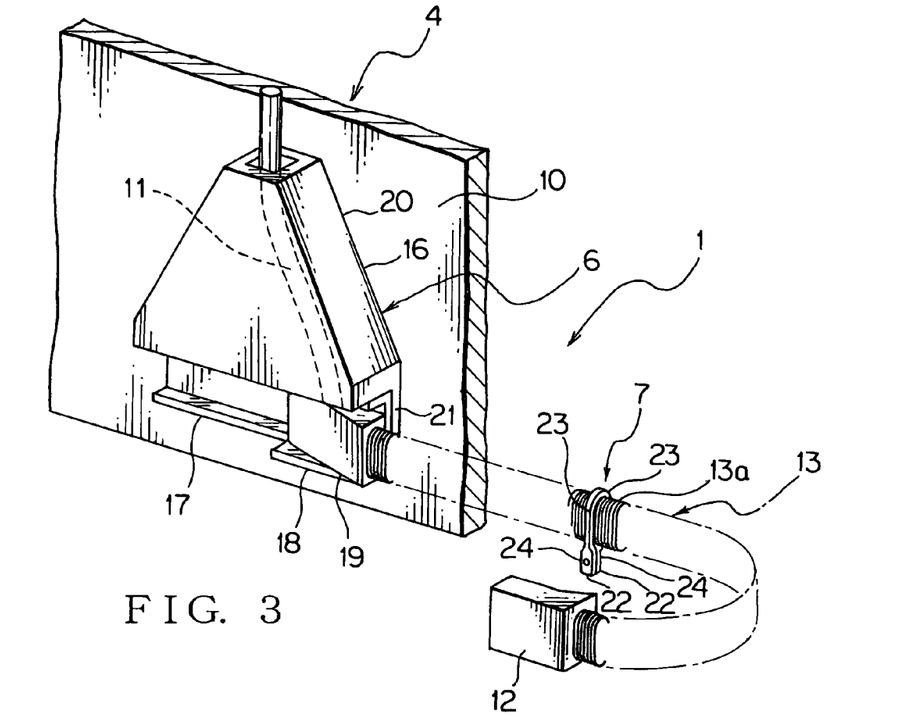
FIG. 3 is a perspective view showing a condition that the sliding door shown in FIG. 2 is positioned in a open position.
Figure 4:
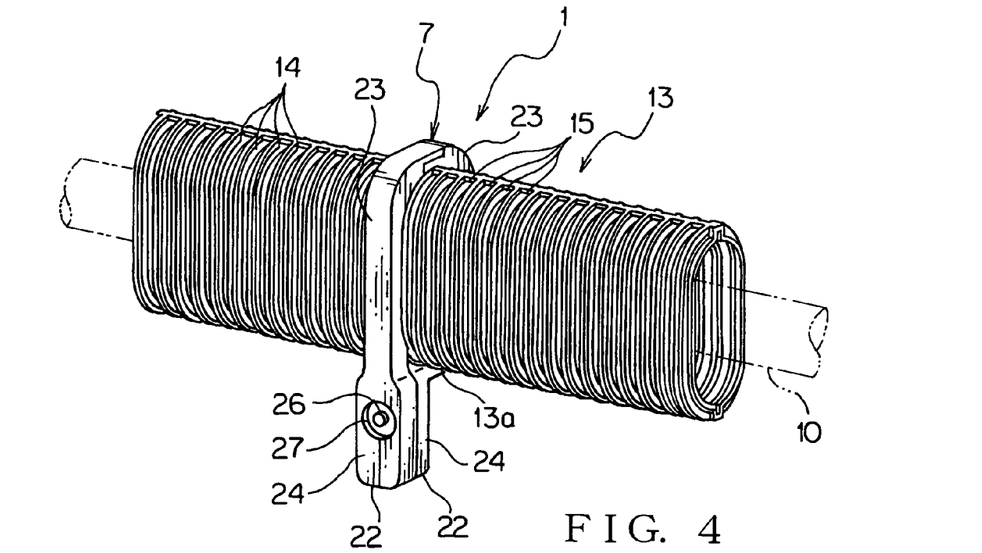
FIG. 4 is a perspective view showing a limiting member of the power supply apparatus shown in FIG. 1.
Figure 5:
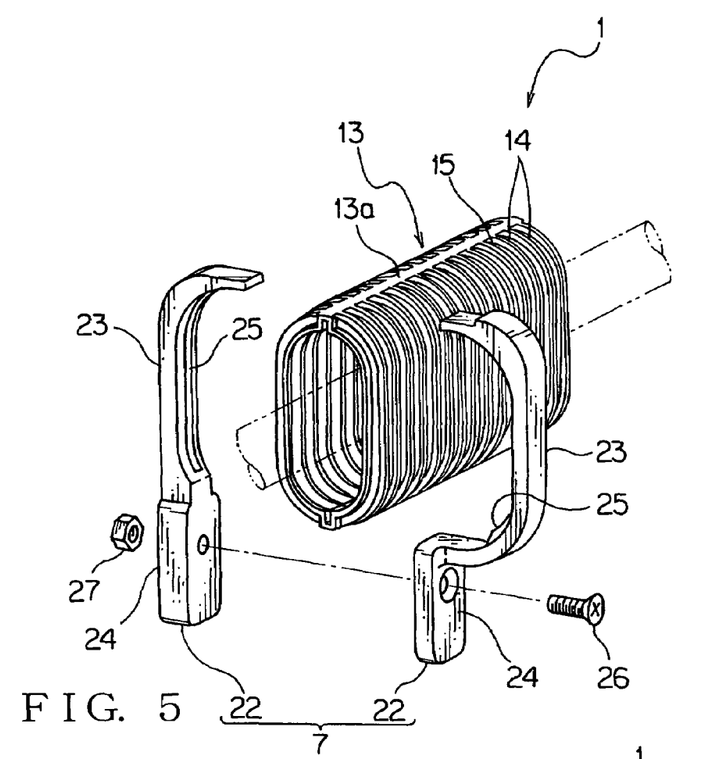
FIG. 5 is an exploded perspective view of the limiting member shown in FIG. 4.
Figure 6:
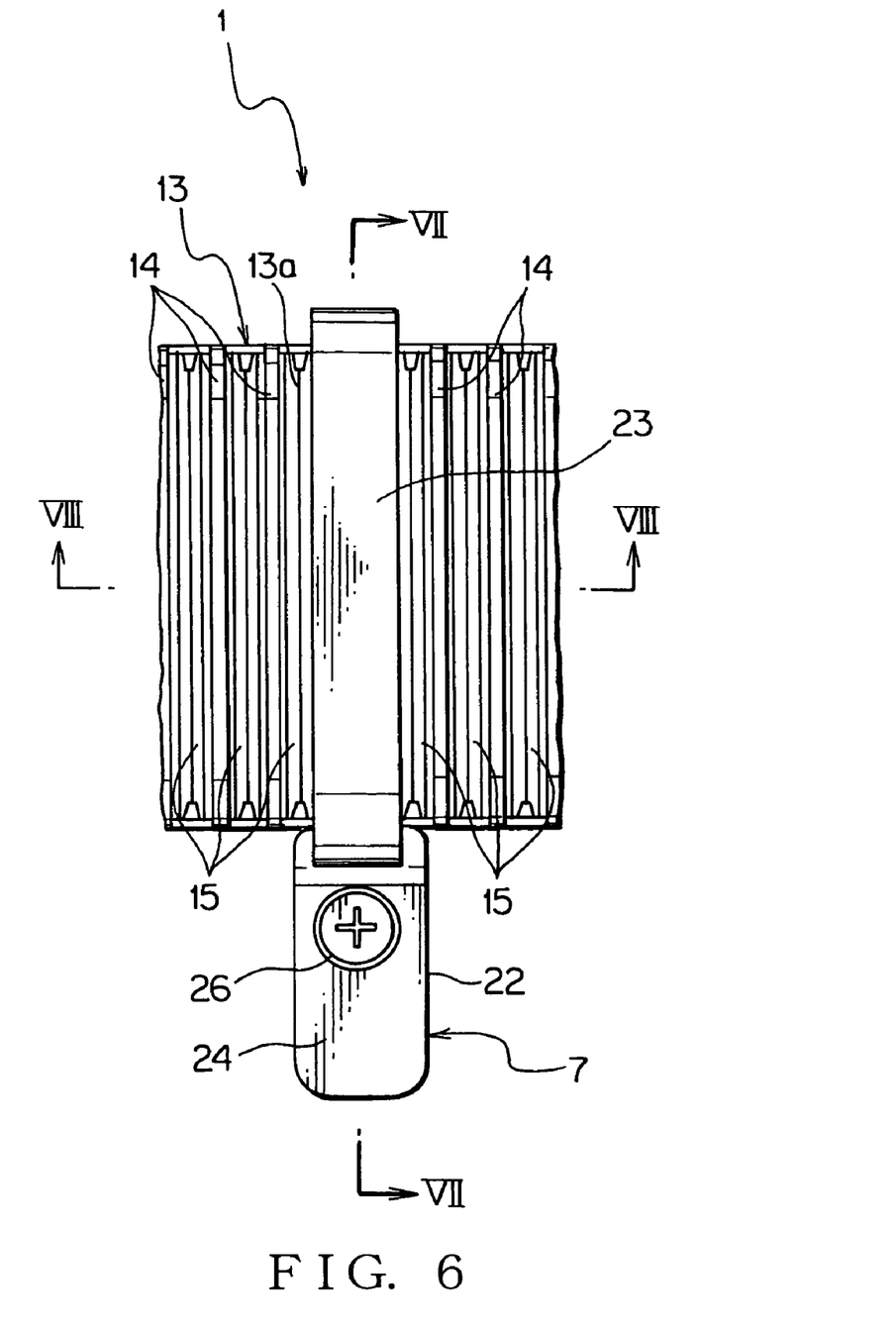
FIG. 6 is a side view of the limiting member shown in FIG. 4.
Figure 7:
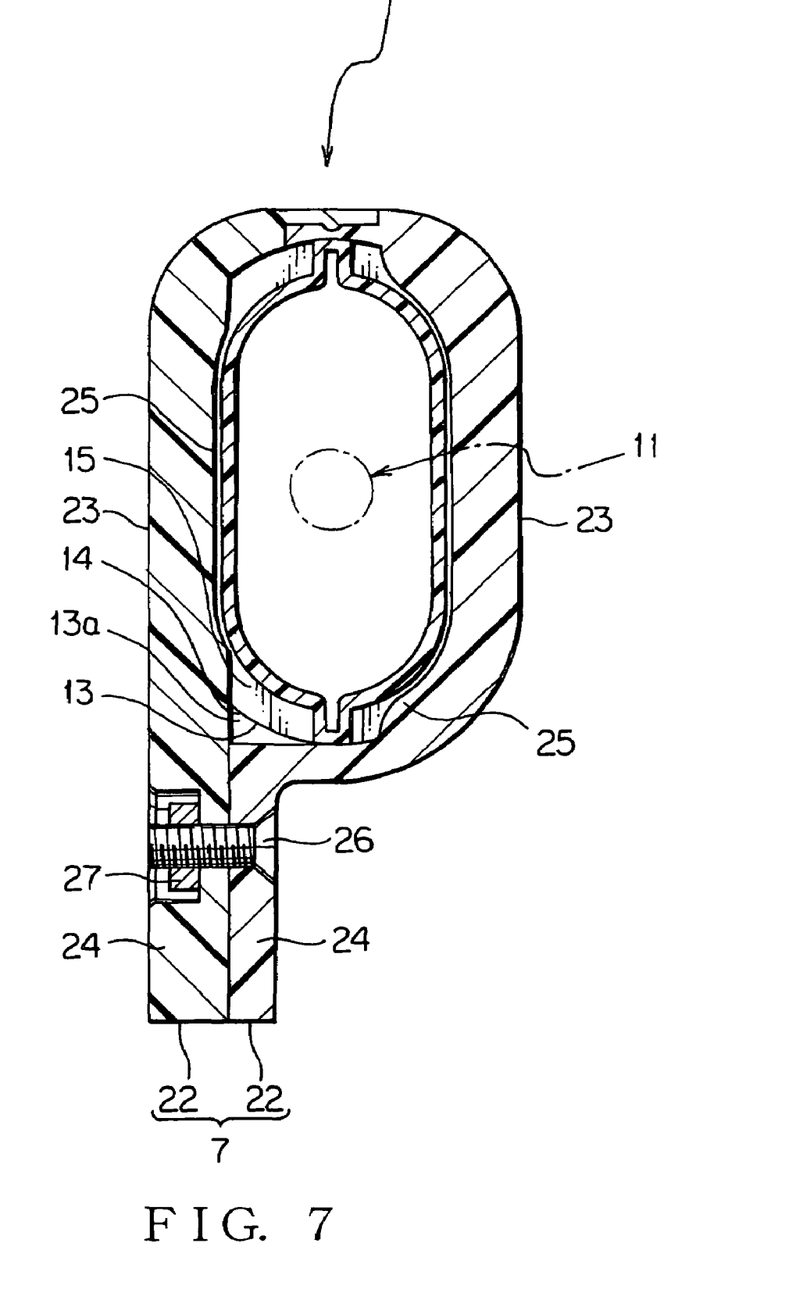
FIG. 7 is a cross sectional view taken along the line VII-VII in FIG. 6.
Figure 8:
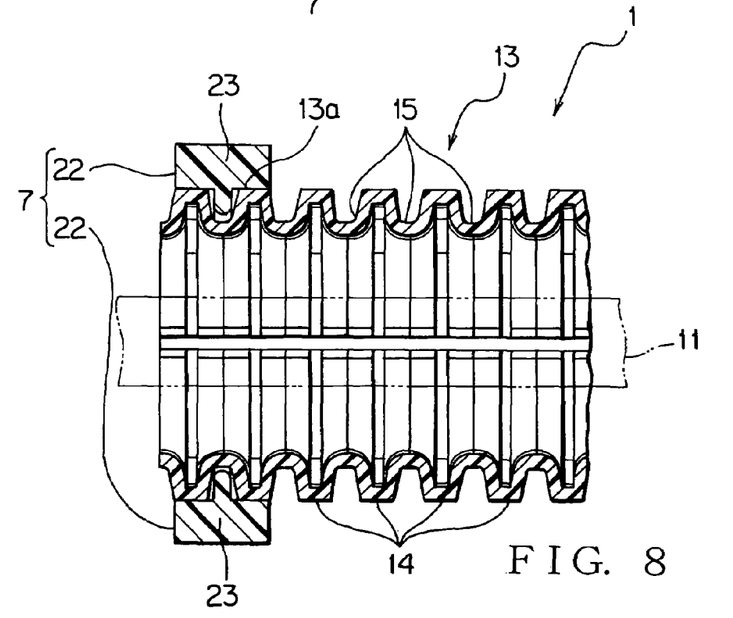
FIG. 8 is a cross sectional view taken along the line VIII-VIII in FIG. 6.

In the corrugate tube 13, convex portions 14 and concave portions 15 surrounding along circumference of the corrugate tube 13 as shown in FIGS. 4, 5 are provided. The convex portions 14 and the concave portions 15 are arranged alternatively along a lengthwise direction of the corrugate tube 13. The corrugate tube is formed into a bellows shape.

The wire bundle 11 passes through the corrugate tube 13. One end of the corrugate tube 13 is attached at the body-side connector 12. The other end of the corrugate tube 13 is attached at a later-described rotating member 19 of fixed portion 6. Thus, the corrugate tube 13 receives the wire bundle 11 wired between the car body 3 and the sliding door 4 for protecting (limiting to damage) the electric wires of the wire bundle 11.

The fixed portion 6 includes a flat case 16, a rail 17, a slider 18 and the rotating member 19. The case 16 is mounted on an inner surface of the door panel 10 of the sliding door 4. The case 16 has a box-shaped body portion 20 and a plate portion 21. The body portion 20 is arranged to have opening portions at a top and a bottom thereof. The body portion 20 is formed to become narrower according to go upward. The plate portion 21 extends from a bottom edge of the body portion 20 below the body portion 21. The plate portion 21 is mounted on the inner surface of the door panel 10 of the sliding door 4.

The rail 17 is mounted on the plate portion 21 of the case 16 so as to extend linearly. Lengthwise of the rail 17 is aligned in a horizontal direction, that is along a front-rear direction of the car 2. The slider 18 is supported by the rail 17, movably along the lengthwise of the rail 17. The rotating member 19 is supported by the slider 18, rotatably around an axis along a vertical direction. The rotating member 19 moves along the lengthwise of the rail 17, together with the slider 18. The other end of the corrugate tube 13 is attached at the rotating member 19.

In the fixed portion 6, the other end of the corrugate tube 13 is attached to the rotating member 19, and the wire bundle 11 in the corrugate tube 13 is led into the case 16 and through the opening portions at the top of the case 16 to the auxiliary device at the sliding door 4. Thus, the fixed portion 6 protects the electric wires of the wire bundle 11 of the wiring harness 5. In the fixed portion 6, when the sliding door 4 slides against the car body 3, the rotating member 19 is pulled by the corrugate tube 13 of the wiring harness 5. Thereby, the rotating member 19 is rotated around the axis, and the slider 18 is slid along the rail 17.

In the fixed portion 6, since the rotating member 19 is rotated and the slider 18 is slid by opening and closing the sliding door 4, loads on the wiring harness 5, especially the electric wires, by opening and closing the sliding door 4 can be reduced. When the sliding door 4 is positioned at the close position, the slider 18 is located at a near side of the body-side connector 12, that is at an end of the rail 17 close to the rear of the car 2, and the rotating member 19 is oriented to a direction from the slider 18 toward the body-side connector 12, that is the rear of the car 2. When the sliding door 4 is positioned at the open position, the slider 18 is located at a near side of the body-side connector 12, that is at an end of the rail 17 close to the front of the car 2, and the rotating member 19 is oriented to a direction from the slider 18 toward the body-side connector 12, that is the front of the car 2.

The limiting device 7 has a plurality of separated member sets 22 as shown in FIGS. 4-8. In the embodiment, one separated member set 22 is provided. The separated member 22 is made of synthetic resin and formed integrally with a mount portion 23 along an outer shape of the corrugate tube 13 and a projecting portion 24 projecting from the mount portion 23 toward an outside of the mount portion 23. The one separated member set 22 is mounted on the corrugate tube 13 so as to clamp the corrugate tube 13 between the mount portions 23. Thus, the mount portions 23 are mounted on the corrugate tube 13.

The mount portion 23 is provided with a positioning projection 25 allowable to penetrate into the concave portion 15 of the corrugate tube 13. Each of the one separated member set 22 has respectively the positioning projection 25. The positioning projection 25 penetrates into the concave portion 15 of the corrugate tube 13 and limit the separated member set 22, that is limiting member 7, to displace in the lengthwise direction of the corrugate tube 13. Thus, the positioning projection 25 positions the limiting member 7 in the lengthwise direction of the corrugate tube 13.

The projecting portion 24 is formed at an end thereof into a bar shape continued to an end portion of the mount portion 23. The projecting portions 24 are overlapped to each other when the separated member set 22 clamps the corrugate tube 13 therebetween. The overlapped projecting portions 24 are fixed to each other with a bolt 26 and a nut 27. Thereby, the projecting portions 24 projects from the corrugate tube 13 toward the outside of the corrugate tube 13.

Figure 9:
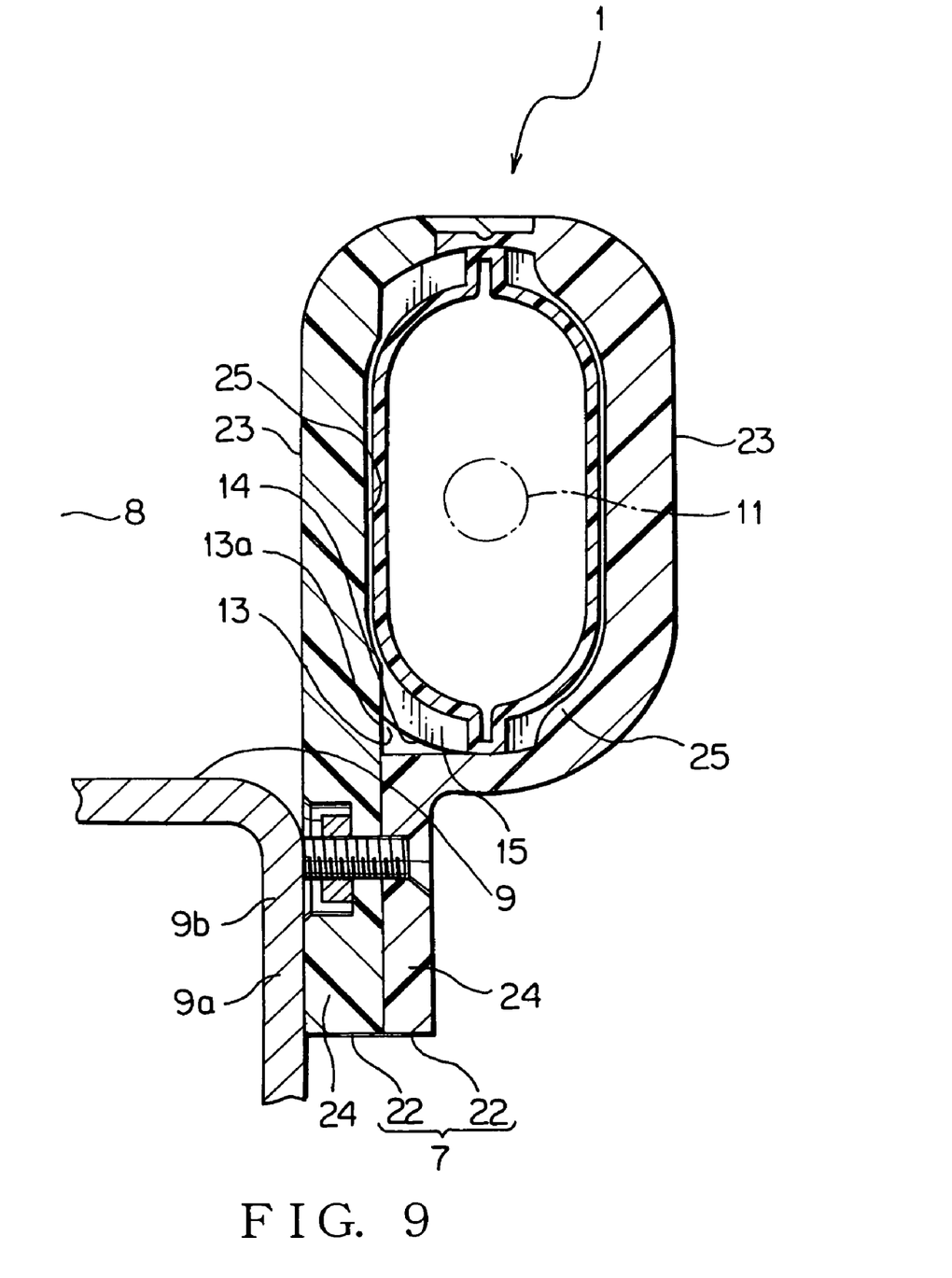
FIG. 9 is a cross sectional view taken along the line IX-IX in FIG. 1.

The limiting member 7 as structured above is mounted on the wiring harness 5 by clamping a center portion 13*a* of the corrugate tube 13 (corresponding to a center portion of the wiring harness 5) between the mounting portions 23 of the separated portions 22. When the sliding door 4 is positioned at the middle position between the close portion and the open position (shown with a solid line in FIG. 1, and called as a half opened condition), the projecting portion 24 of the limiting member 7 mounted at the center portion of the corrugate tube 13, that is wiring harness 5, abuts on an inner edge 9*a* of the opening portion 9 as shown in FIG. 9. The inner edge 9*a* is an edge of the car body 3 surrounding the opening 9. In the embodiment, the projecting portion 24 abuts on a bottom edge 9*b* of the inner edge 9*a* of the opening 9.

When the projecting portion 24 of the limiting member 7 abuts on the bottom edge 9*b* (the inner edge 9*a*) of the opening 9, the center portion 13*a* of the wiring harness 5, in which the limiting member 7 is mounted, is limited to move (penetrate) into the car main body 8. Thus, the projecting portion 24 of the limiting member 7 can abut on the bottom edge 9*b* of the inner edge 9*a* of the opening 9, and when the projecting portion 24 abuts on the bottom edge 9*b*, the limiting member 7 limits the corrugate tube, that is wiring harness 5, to move (penetrate) into the car main body 8.

Furthermore, when the sliding door 4 is positioned at the close position, even if the limiting member 7 is pushed toward an inside of the passenger room by the elastic restoring force of the corrugate tube 13 or vibration, the projecting portion 24 abuts on the bottom edge 9*b* of the opening 9. When the sliding door 4 is positioned at the close position, the projecting portion 24 abuts on the bottom edge 9*b* and limits the corrugate tube 13 to vibrate and make sound noise.

According to the embodiment, since the limiting member 7 allowable to abut on the bottom edge 9*b* of the inner edge 9*a* of the opening 9 is provided at the wiring harness, the limiting member 7 abuts on the bottom edge 9*b* of the inner edge 9*a* of the opening 9 so as to limit the wiring harness 5 to move (penetrate) into the car main body 8. Thereby, it is prevented that the wiring harness 5 is caught by an object in the car main body 8 and the wiring harness 5 is broken unexpectedly.

Since the limiting member 7 abuts on the bottom edge 9*b* of the inner edge 9*a* of the opening 9 when the sliding door 4 is positioned at the close position, it is prevented that the wiring harness 5 is vibrated. Thereby, sound noise generated by that is prevented.

Since the limiting member 7 is provided at the center portion in the lengthwise direction of the wiring harness 5, the center portion of the wiring harness 5, which is most easily slacked, is limited to penetrate into the car main body 8. Thereby, it is securely prevented that the wiring harness 5 is broken unexpectedly.

Since the projecting portion 24 of the limiting member 7 projects from the corrugate tube 13, the projecting portion 24 can abut securely on the bottom edge 9*b* of the inner edge 9*a* of the opening 9. Since the limiting member 7 has the mount portion 23 attached on the wiring harness 5, the limiting member 7 is securely attached on the wiring harness 5. Thereby, it is securely prevented that the wiring harness 5 penetrates into the car main body 8 and the wiring harness 5 is broken unexpectedly.

Since the corrugate tube 13 is formed into a bellows shape and the separated member 22 is provided with the positioning projection 25 to penetrate into the concave portion 15 of the corrugate tube 13, it is prevented that the separated member 22, that is the limiting member 7, is displaced along the lengthwise direction of the wiring harness 5. It can be prevented that the limiting member 7 is displaced from a position allowable to abut on the bottom edge 9*b* of the inner edge 9*a* of the opening 9. Thereby, it can be more securely prevented by the limiting member 7 that the wiring harness 5 penetrates into the car main body 8.

In the embodiment, the limiting member 7 includes one separated member set 22. According to the present invention, the limiting member 7 can have three or more separated members 22. Each separated member 22 has the positioning projection 25. At least one of the plurality of separated members 22 may have the positioning projection 25.

According to the present invention, at least outer surface of the limiting member 7 can be made of synthetic resin such as an elastic deformable elastomer. The separated members 22 of the limiting member 7 can be fixed to each other with the means other than the bolt 26 and the nut 27.

In the embodiment, the limiting member 7 abuts on the bottom edge 9*b* of the inner edge 9*a* of the opening 9. The limiting member 7 can abut on the other than the bottom edge 9*b* of the inner edge 9*a* of the opening 9. The wiring harness 5 has the corrugate tube 13. According to the present invention, the wiring harness 5 is not required to have a tube, such as the corrugate tube 13. The corrugate tube 13 can have the other shape. The other tubular body can be used for the tube. According to the present invention, the fixed portion 6 can be variously structured.

In the embodiment, the power supply apparatus 1 for supplying power continuously to the auxiliary devices mounted at the sliding door 4. The present invention can be applied to a power supply apparatus for supplying power continuously to an auxiliary device mounted on a slidable roof panel against a roof of the car body 3 as the base. The present invention can be applied to the other than the car 2. In short, the present invention can be applied to a power supply apparatus for supplying power continuously to an auxiliary device mounted on an slidable structure against a base having an opening.

While, in the embodiment, the present invention is described, it is not limited thereto, and various change and modifications can be made with the scope of the present invention.

What is claimed is:

1. A power supply apparatus for a sliding structure comprising:
    a base having an opening;
    the sliding structure provided slidably against the base so as to move between a closed position, in which the sliding structure closes the opening, and an open position, in which the sliding structure opens the opening;
    a wiring harness wired between the base and the sliding structure; and
    a limiting device provided at the wiring harness so as to move with and limit the wiring harness to move toward the base by abutting on an inner edge portion of the opening when the sliding structure positions between the closed position and the open position.

2. The power supply apparatus for the sliding structure according to claim 1, wherein the limiting device is mounted on a center portion in a lengthwise direction of the wiring harness.

3. A power supply apparatus for a sliding structure comprising:
    a base having an opening;
    the sliding structure provided slidably against the base so as to move between a closed position, in which the sliding structure closes the opening, and an open position, in which the sliding structure opens the opening;
    a wiring harness wired between the base and the sliding structure; and
    a limiting device mounted on the wiring harness so as to limit the wiring harness to move toward the base by abutting on an inner edge portion of the opening when the sliding structure positions between the closed position and the open position, wherein the limiting device is arranged at a center portion in a lengthwise direction of the wiring harness, and
    wherein the wiring harness includes an electric wire, and the limiting device includes a mount portion to be mounted on a tube body and a projecting portion projecting from the mount portion and allowable to abut on the inner edge portion of the opening.

4. The power supply apparatus for the sliding structure according to claim 3, wherein the tube body is formed into a bellows shape with alternated convex portions and concave portions along the lengthwise direction of the wiring harness, and the limiting device includes a plurality of separated member sets, at least one separated member set having a positioning projection to penetrate into the concave portion.

* * * * *